Dec. 24, 1935.  E. BROSSET  2,025,436

ADJUSTABLE VEHICLE SEAT

Filed Sept. 2, 1932

Inventor:
Eloi Brosset
per Fred F. Bailer
Attorney

Patented Dec. 24, 1935

2,025,436

UNITED STATES PATENT OFFICE 2,025,436

ADJUSTABLE VEHICLE SEAT

Eloi Brosset, Montbeliard, France

Application September 2, 1932, Serial No. 631,493
In France March 8, 1932

2 Claims. (Cl. 155—14)

The invention relates to a construction of seats whereby the back may be set at variable inclinations and is more particularly intended to be used in connection with motor or other vehicles though it may also be applied to dwelling room furniture.

In motor cars as actually constructed, the driver's as well as the passenger's seats are located in the car at places considered as convenient by the builder and in such a way that there is an allowable change of place which is but small and can only be effectuated forwardly and rearwardly; and moreover the undoing or unscrewing of inaccessible screws or whatever tightening means is difficult.

The tilting of motor-car seats as actually constructed is seldom adjustable and passengers must do their best with the position, shape and form that have been given the backs by the builder without consideration of the convenience or comfort of the passengers. They are thus often constrained to travel in uncomfortable and even difficult positions.

To obviate the said inconveniences, the present invention aims to the construction of a variably inclinable seat comprising a seat cushion and its back cushion, hinged together and able to rock as a whole about a rear support, the characteristic of the invention being that the reclining of the seat is guided by a curved guide, the curvature radius of which is equal to the distance between the rearmost position of the rear support and the guide. No special manipulation is needed for setting the seat in a special inclination. The rocking of the seat is effectuated by a mere push of the seater who thus takes automatically the most comfortable position.

Embodiments of the invention are diagrammatically shown in the accompanying drawing in which.

Figure 1:
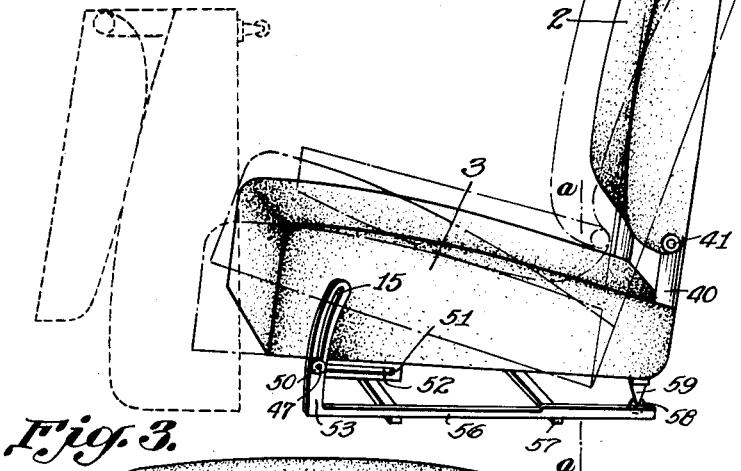
Fig. 1 is a side view of a first form of seat constructed according to the invention.
Figure 2:
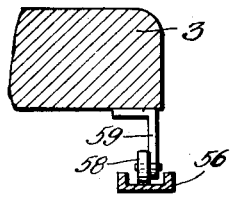
Fig. 2 is a view in cross section through line a—a of Fig. 1.
Figure 3:
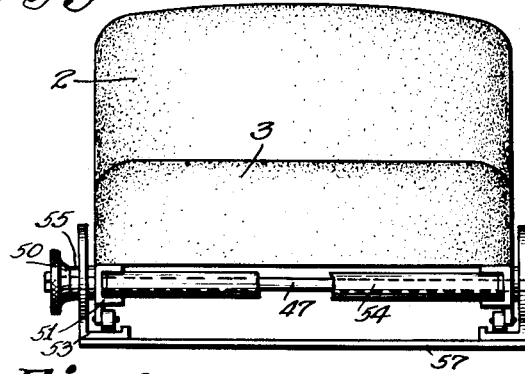
Fig. 3 is a front view of the seat shown in Fig. 1.

The preferred form of construction of vehicle seat according to the invention is shown in Figures 1 and 2 of the accompanying drawing. The bottom or sitting element of the seat bears at the rear through two short feet 59, terminated by balls 58, in the groove of channel irons 56, made fast with the floor by any known means; at the front the seat is supported by a construction permitting it to be rocked about its rear feet 59, and locked at any desired inclination. This construction comprises two channel bars 51, fixed at both sides to the under face of the seat and flush with the lateral faces thereof. These channel bars are slotted to provide a guideway 52 of such a length as is required by the longitudinal displacement intended to be given to the seat. Through slots 52, there passes a rod 47 which passes also through curved slots 15 of uprights 53 of the framework; this rod is enclosed in a spacing tube 54 of a length equal to the distance between the internal webs of the channel bars 51, and of such a diameter as to be freely guided between the wings of the channel bars. A tightening handle 50 is screwed onto the rod 47 and effects the locking of the seat in any desired inclination or longitudinal position. The locking is rendered easy and efficient by means of a washer 55 interposed between the handle 50 and the upright 53.

A slight pull by the occupant or an adjusting spring (not shown) effects the foreward movement of the seat as shown in dot and dash lines in Figure 1.

Each upright 53 extends backwards parallel with the channel bar 51 to form a bar 56, channel shaped at its rear end and serving, as above stated, as a runway for each ball terminating rear foot 59 of the seat.

The warping of bars 56 is prevented by their bracing by flat irons 57. Owing to this construction, the seat can be moved longitudinally, under rolling of the rollers 58 in their respective guides or tracks, whilst rocking vertically by turning about same rollers 58.

In order to facilitate the longitudinal sliding of the seat, ball bearing collars or any appropriate frictionless means may be located on the rod 47, between the brace or spacing bar 54 and the guides 51. By this simple means the inclination of the seat may be varied without shifting the seat horizontally, or the seat may be shifted generally or the seat may be tipped up at its front end.

Figure 4:
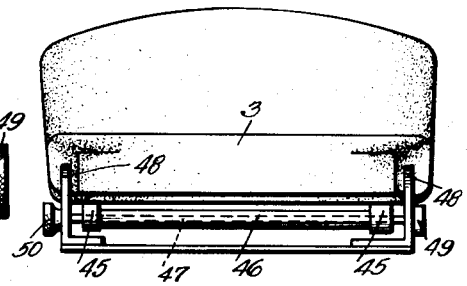
Fig. 4 is a front view of a modification.

When the seat is vacated in order to clear the way to the rear seats, the bottom is hinged to cross bar 47 as shown in Fig. 4. The seat bottom is here provided at its under face with two bearings 45, connected by a spacing tube 46, within which can slide a rod 47 passing at each end through the guides 15 of uprights 48; one end 49 of this rod is flattened so as to prevent rotation of rod 47 and the other end is locked in the desired position by handscrew 50.

The tightening of this screw 50 has for effect to clasp the uprights against the spacing tube and so to lock the seat.

Figure 6:
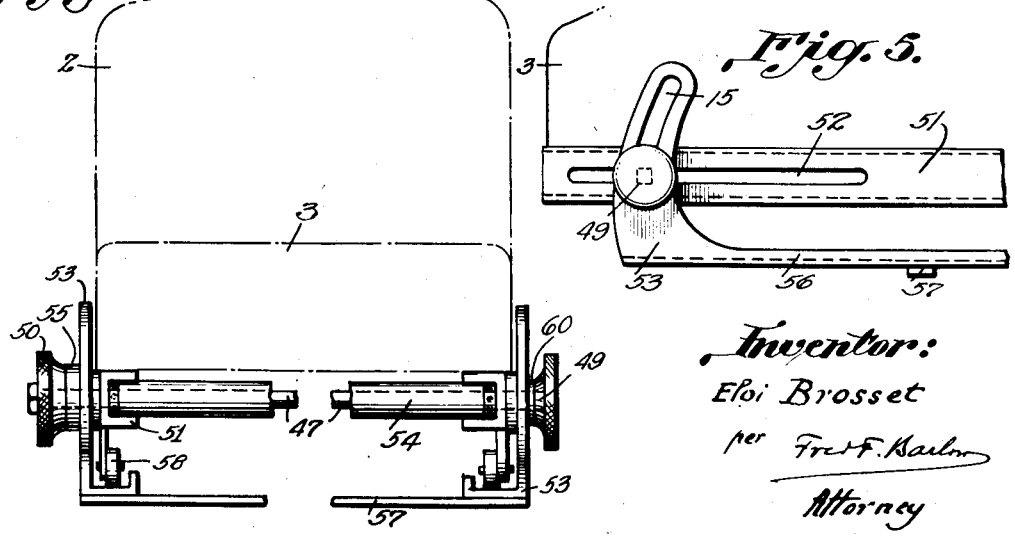
Figs. 5 and 6 show at a larger scale the details of the seat controlling means.

The rod 47 (Figs. 5 and 6) passes at both ends through slots 52 of angle or channel irons 51 secured to the under face of the seat bottom, it passes also through slot 15 of the curved guides 53. At one end (at the right of Fig. 4) the rod is given a greater diameter and this wider part 49 serves as abutment of the rod against the guide 53 when the hand screw 50, situated at the other end of rod 47 is screwed on, pressing on the guide 53 situated at the left side of Fig. 6.

Figure 5:
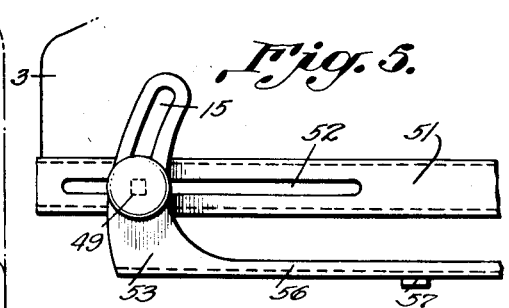

In order to obviate the turning of the rod, and allow the said locking function of the hand screw to operate properly, the portion of rod 47 passing through slot 15 is squared or flattened as shown at 60 in Fig. 5, this squared portion 60 fits in the slot.

It is thus seen that when hand nut 50 is screwed on, the rod 47, abutting at its other end by its wider portion 60 becomes locked in both guides 53 in a point of slot 15 which corresponds, considering the rear feet of the seat, to the inclination that is desired to be given to the seat by the occupant.

In the embodiments shown and described, the seat is resiliently mounted on its framework through coil springs; for the same purpose of resiliency, the springs may be omitted and replaced by air or water brakes or even by mere rubber washers.

As the seat is spring suspended, the bottom and back need not be made with soft cushions, but formed of a single piece of resilient and stuffed cloth or wire gauze.

It must be noted that the construction shown and described in reference with Figures 1 and 2 permits a very easy longitudinal and inclined setting of the seat, the single regulating handle used for all movements to be imparted, being within easy hand reach of the seated person who can change his position without leaving his seat and change immediately to a new comfortable position. The driver can for instance effect by himself, and without any help, the longitudinal displacement of his seat so as to take any convenient and comfortable position relative to the steering wheel.

It must specially be noted that the system of seat described allows the seater to obtain any desired position by a single back push and the use of a single handle serving as well for the longitudinal as for the inclined position.

I claim:

1. An adjustable seat comprising a bottom cushion and a back cushion connected thereto and means for adjusting the inclination of the seat and to shift it fore and aft, comprising a support at the rear of the seat and a runway on the floor guiding this support, and a guide at the front and on the under face of the bottom cushion comprising at each side of said bottom, a channel iron with slotted web, the wings of this channel iron serving as guides for a tube containing a straight bar passing at both ends through the slots of the channel irons and thence through a slotted curved guide at each end of the bar, the base of said curved guide being fastened to a rail forming a forward prolongation of said runway, said rod being held from turning by a flattened end in one of the guide slots, an enlargement on said end and said rod provided at the other screw threaded end, with a fastening hand nut.

2. A swinging vehicle seat comprising a bottom cushion and a back cushion fast with one another, supported at the rear by two feet and at the front by two bearings situated at the under face of the bottom cushion and near the fore end thereof, said bearings embracing a transverse spindle supported in two lateral brackets fastened to the floor; said spindle being held from turning by a flattened end in one of these brackets said end having an enlarged portion and said rod provided at its other, screw threaded, end with a tightening hand nut, a spacing tube covering the spindle between the two said bearings, the seat being able to turn about the spindle forwardly.

ELOI BROSSET.